(12) United States Patent
Mukundan et al.

(10) Patent No.: US 9,104,582 B1
(45) Date of Patent: Aug. 11, 2015

(54) OPTIMIZED DATA STORAGE

(75) Inventors: Sunil Mukundan, Chennai (IN); Saravanan Purushothaman, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 405 days.

(21) Appl. No.: 13/340,420

(22) Filed: Dec. 29, 2011

(51) Int. Cl.
*G06F 12/02* (2006.01)
*G06F 12/08* (2006.01)

(52) U.S. Cl.
CPC .................................. *G06F 12/0893* (2013.01)

(58) Field of Classification Search
CPC ................................................... G06F 12/0893
See application file for complete search history.

(56) References Cited

U.S. PATENT DOCUMENTS

| 7,496,678 | B2 * | 2/2009 | Yadav et al. | 709/231 |
| 2006/0259637 | A1 * | 11/2006 | Yadav et al. | 709/231 |
| 2008/0155592 | A1 * | 6/2008 | Walter et al. | 725/34 |
| 2009/0228744 | A1 * | 9/2009 | Deenadhayalan et al. | 714/48 |
| 2012/0110036 | A1 * | 5/2012 | Rabii | 707/822 |

OTHER PUBLICATIONS

Co-pending U.S Appl. No. 13/077,831 entitled "Media File Storage Format and Adaptive Delivery System", by Visharam et al., filed Mar. 31, 2011, 125 pages.

* cited by examiner

*Primary Examiner* — Charles Rones
*Assistant Examiner* — Ryan Dare
(74) *Attorney, Agent, or Firm* — Harrity & Harrity, LLP

(57) ABSTRACT

A device is configured to receive first data of a media file. The first data is in a first type of format. The device is further configured to extract media data and metadata from the first data, to store the media data in a first cache, and to store the metadata in a second cache. The device is also configured to determine a second type of format that is supported by a client device. The second type of format is different from the first type of format. The device is configured to retrieve the media data from the first cache, to retrieve the metadata from the second cache, to construct second data that is in the second type of format based on the media data and the metadata, and to provide the second data to the client device.

20 Claims, 8 Drawing Sheets

OPTIMIZED DATA STORAGE

BACKGROUND

Service providers use cache servers to provide content, such as video content, from content providers to client devices. A content provider often provides content, to a cache server, in a media file that is in a particular format, such as in a packetized format or in a monolithic format. A client device may only support a type of format that is different from the particular format. The client device cannot play a media file that is in the particular format when the client device does not support the particular format. The cache server may waste valuable resources by storing the same content in multiple types of formats.

SUMMARY

According to one aspect, a method may include receiving, by a device, first data of a media file. The first data may be in a first type of format. The method may further include extracting, by the device, media data and metadata from the first data; storing, by the device, the media data in a first cache; storing, by the device, the metadata in a second cache; and determining, by the device, a second type of format that is supported by a client device. The second type of format may be different from the first type of format. The method may also include retrieving, by the device, the media data from the first cache; retrieving, by the device, the metadata from the second cache; constructing, by the device, second data that is in the second type of format based on the media data and the metadata; and providing, by the device, the second data to the client device.

According to another aspect, a device may include a first cache, a second cache, and a processor. The processor may receive first data of a media file. The first data may be in a first type of format. The processor may further extract media data and metadata from the first data, store the media data in the first cache, store the metadata in the second cache, and determine a second type of format that is supported by a client device. The second type of format may be different from the first type of format. The processor may also retrieve the media data from the first cache, retrieve the metadata from the second cache, construct second data that is in the second type of format based on the media data and the metadata, and provide the second data to the client device.

According to still another aspect, one or more computer-readable media, containing one or more instructions, which when executed by at least one processor, may cause the at least one processor to: receive first data of a media file, extract media data and metadata from the first data, store the media data and the metadata in separate caches, and determine a second type of format that is supported by a client device, retrieve the media data and the metadata from the separate caches, construct second data that is in the second type of format based on the media data and the metadata, and provide the second data to the client device. The first data may be in a first type of format. The second type of format may be different from the first type of format.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, described herein, may provide a cache server that separately stores media data and metadata of a media file. For example, a cache server may receive input data, of a media file, that is in a first type of format. The cache server may extract media data and metadata from the input data. The cache server may store the media data in a media data cache, and may store the metadata in a metadata cache. The cache server may further receive, from a client device, a request for content associated with the media file. The request may specify a second type of format supported by the client device, which is different from the first type of format. The cache server may construct, based on the media data and the metadata, output data that is in the second type of format, and provide the output data to the client device.

As a result, the client device may play the media data even if the client device does not support the first type of format. Furthermore, the cache server does not need to waste resources by storing data for the media file in different types of formats. Instead, the cache serer can store a simple copy of the data and convert the data, as needed, to an appropriate format supported by a client device.

Figure 1:
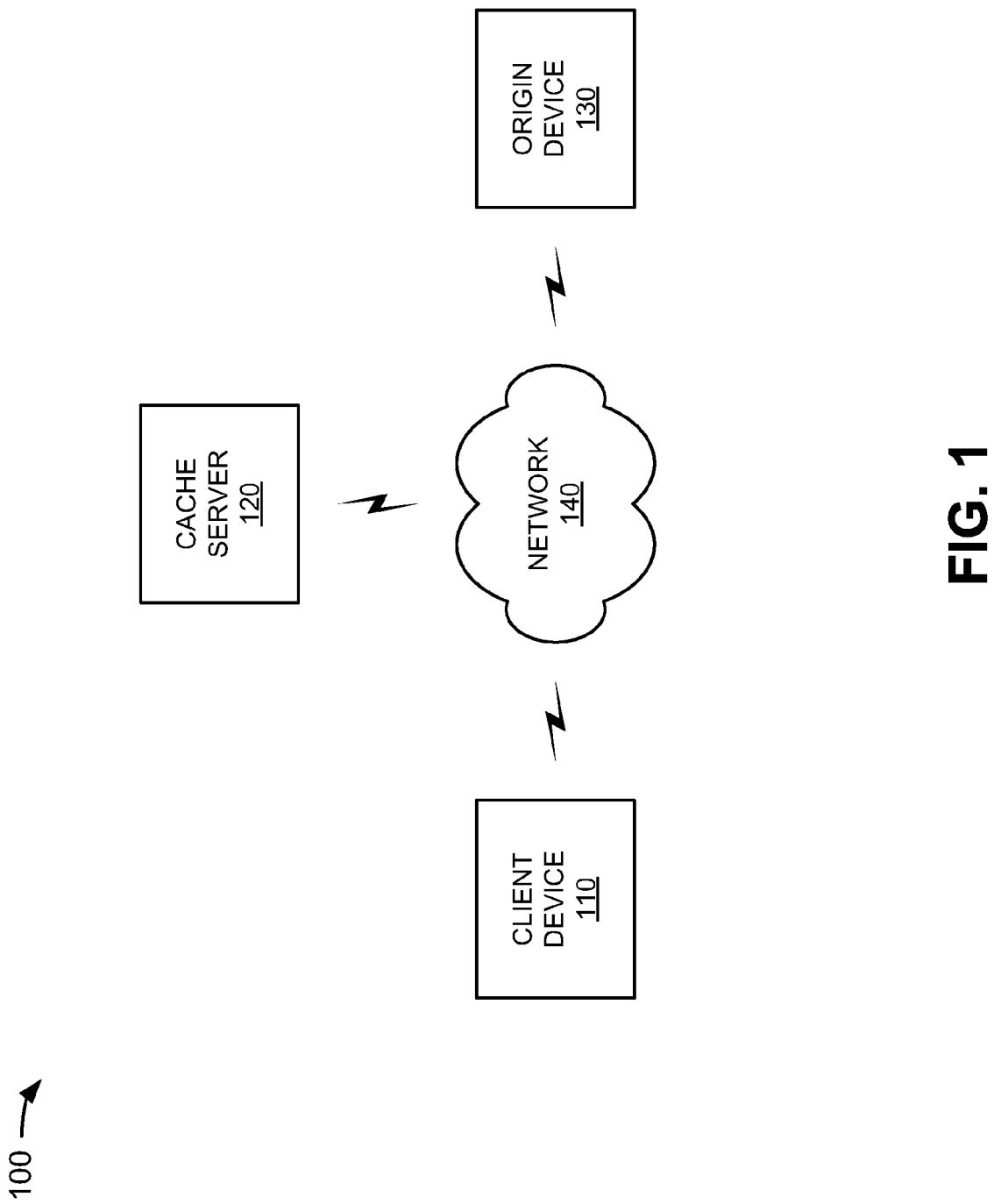
FIG. 1 is a diagram of an example network in which systems and/or methods described herein may be implemented.

FIG. 1 is a diagram of an example network 100 in which systems and/or methods described herein may be implemented. As illustrated, network 100 may include a client device 110, a cache server device 120 (referred to herein as "cache server 120"), an origin device 130, and a network 140. Devices/networks of network 100 may interconnect via wired and/or wireless connections or links. A single client device 110, cache server 120, origin device 130, and network 140 have been illustrated in FIG. 1 for simplicity. In practice, there may be more client devices 110, cache servers 120, origin devices 130, and/or networks 140.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more tasks described as being performed by one or more other devices/networks of network 100.

Client device 110 may include a device that is capable of communicating with cache server 120 via network 140 and/or consuming media files. For example, client device 110 may include a radiotelephone; a personal communications system (PCS) terminal that may combine a cellular radiotelephone with data processing and data communications capabilities; a personal digital assistant (PDA) that can include a radiotelephone, a pager, Internet/intranet access, etc.; a wireless device (e.g., a wireless telephone); a smart phone; a workstation computer; a laptop computer; a personal computer; or other types of devices.

Cache server 120 may include one or more servers, and/or one or more other types of devices, that gather, process, search, and/or provide information in a manner described herein. In one example implementation, cache server 120 may act as an intermediary for requests from client device 110 seeking media files from origin device 130. Cache server 120 may store media data and metadata of media files in separate caches, and may generate, based on the media data and/or the metadata, output data that is in a particular format specified by a request received from client device 110. Cache server 120 may provide the output data to client device 110 in response to the request.

Origin device 130 may include one or more servers, and/or one or more other types of devices, that gather, process, search, and/or provide media files in a manner described herein. In one example implementation, origin device 130 may store media files that may be requested by client device 110. In one example, origin device 130 may provide a particular media file to cache server 120 for storage. Cache server 120 may store the particular media file so that cache server 120 may provide the particular media file to client device 110, when requested by client device 110. In another example implementation, origin device 130 may receive a request for a particular media file from cache server 120 after cache server 120 receives a request for content associated with the particular media file. Origin device 130 may provide the particular media file to cache server 120 in response to the request for the particular media file.

Network 140 may include a service provider network, such as a local area network (LAN); a wide area network (WAN); a metropolitan area network (MAN); a telephone network (e.g., the Public Switched Telephone Network (PSTN) or a cell network); the Internet; or a combination of networks.

Figure 2:
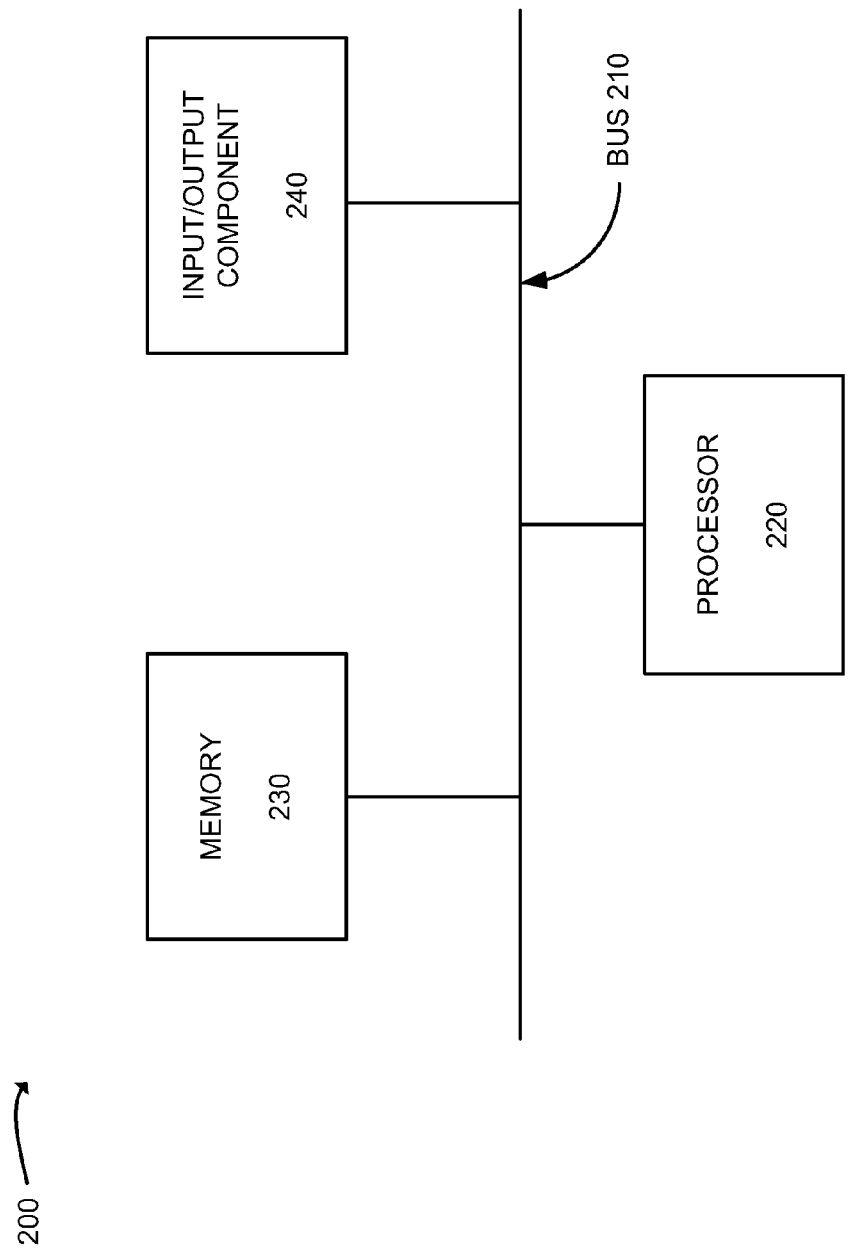
FIG. 2 is a diagram of example components of one or more devices of FIG. 1.

FIG. 2 is a diagram of example components of a device 200, which may correspond to client device 110, cache server 120, and/or origin device 130. Each one of client device 110, cache server 120, and/or origin device 130 may include one or more devices 200 and/or one or more components of device 200. As shown in FIG. 2, device 200 may include a bus 210, a processor 220, a memory 230, and an input/output component 240.

Although FIG. 2 illustrates example components of device 200, in other implementations, device 200 may include additional components, fewer components, different components, or differently arranged components than those illustrated in FIG. 2 and described herein. Alternatively, or additionally, one or more components of device 200 may perform one or more tasks described as being performed by one or more other components of device 200.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Memory 230 may include a random access memory (RAM) or another type of dynamic storage device that may store information and instructions for execution by processor 220; a read only memory (ROM) or another type of static storage device that may store static information and instructions for use by processor 220; a magnetic and/or optical recording medium and its corresponding drive; and/or a removable form of memory, such as a flash memory.

Input/output component 240 may include a mechanism that permits an operator to input information to device 200, such as a keyboard, a keypad, a mouse, a button, a pen, a touch screen, etc., and/or a mechanism that outputs information to the operator, including a display, a light emitting diode (LED), a speaker, etc. Additionally, or alternatively, input/output component 240 may include any transceiver-like mechanism that enables device 200 to communicate with other devices and/or systems. For example, input/output component 240 may include a wired interface (e.g., an Ethernet interface, an optical interface, etc.), and/or a wireless interface (e.g., a radio frequency (RF) interface, a wireless fidelity (Wi-Fi) interface, a Bluetooth interface, etc.).

As will be described in detail below, device 200 may perform certain operations. Device 200 may perform these and other operations in response to processor 220 executing software instructions (e.g., computer program(s)) contained in a computer-readable medium, such as memory 230, a secondary storage device (e.g., hard disk, CD-ROM, etc.), etc. A computer-readable medium may be defined as a non-transitory memory device. A memory device may include a space within a single physical memory device or spread across multiple physical memory devices. The software instructions may be read into memory 230 from another computer-readable medium or from input/output component 240. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
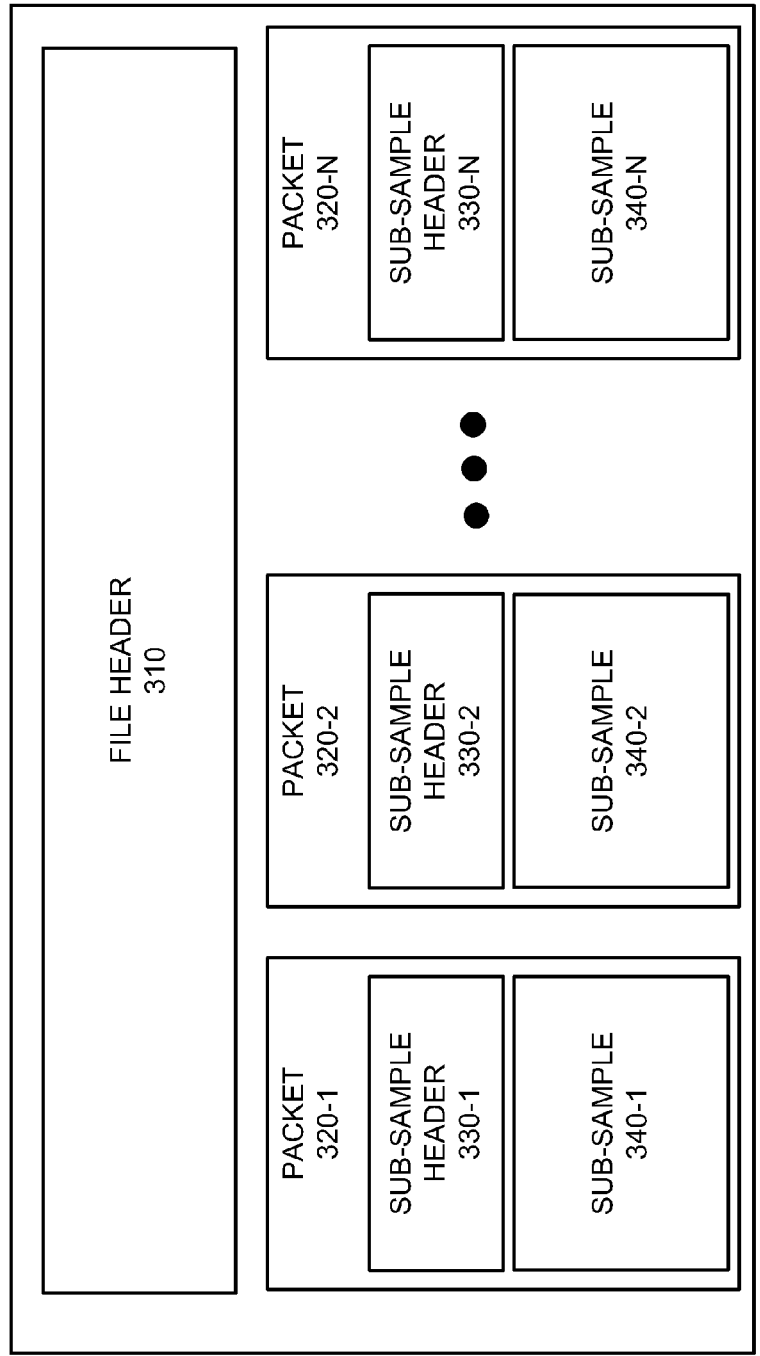
FIG. 3 illustrates an example structure of a media file in a monolithic format.

FIG. 3 illustrates an example structure of a media file 300 in a monolithic format. As shown in FIG. 3, media file 300 may include a file header 310 and packets 320-1, . . . , 320-N (where N≥1) (hereinafter referred to collectively as "packets 320," and individually as "packet 320"). Packets 320 may include sub-sample headers 330-1, . . . , 330-N (hereinafter referred to collectively as "sub-sample headers 330," and individually as "sub-sample header 330") and sub-samples 340-1, . . . , 340-N (hereinafter referred to collectively as "sub-samples 340," and individually as "sub-sample 340"). Each packet 320 may include sub-sample header 330 and sub-sample 340.

Sub-sample 340 may include media data of media file 300. The media data may include, for example, audio data and/or video data. One or more sub-samples 340 may make up a sample. The sample may include media data, from the one or more sub-samples 340, that is of a particular unit of time (e.g., 1 second) in length when the sample of media data is played by client device 110.

Sub-sample header 330 may include information about a corresponding sub-sample 340. For example, sub-sample header 330-1 may include information that specifies a size of sub-sample 340-1 and/or information that describes media data included in sub-sample 340-1. The information that describes the media data may indicate, for example, that the media data only includes a representation of a blank screen or that the media data includes an indicator that specifies that an advertisement may be displayed when the media data is played by client device 110. In one implementation, client device 110 may not require the information included in sub-sample headers 330. In another implementation, cache server 120 may automatically reconstruct the information included in sub-sample headers 330 based on pre-defined rules. In yet another implementation, sub-sample headers 330 may not include any information.

File header 310 may include metadata of media file 300. The metadata may include a description of all the media data included in sub-samples 340 and/or any other information that may be required by client device 110 in order to play the media data. In some implementations, some client devices 110, which support particular types of monolithic formats, may not require the metadata included in file header 310 in order to play the media data.

Figure 4:
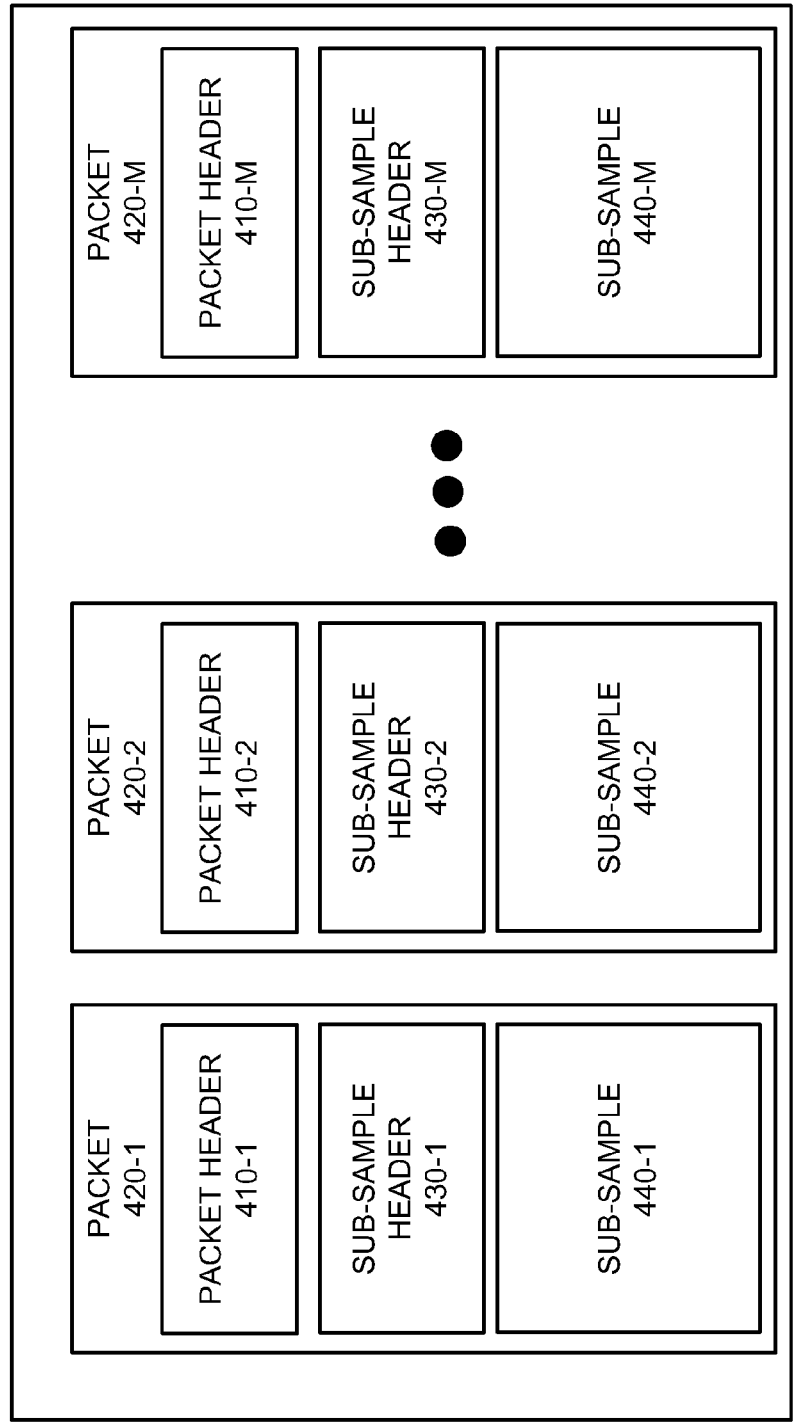
FIG. 4 illustrates an example structure of a media file in a packetized format.

FIG. 4 illustrates an example structure of a media file 400 in a packetized format. As shown in FIG. 4, media file 400 may include packets 420-1, . . . , 420-M (where M≥1) (hereinafter referred to collectively as "packets 420," and individually as "packet 420"). Packets 420 may include packet headers 410-1, . . . , 410-M (hereinafter referred to collectively as "packet headers 410," and individually as "packet header 410"), sub-sample headers 430-1, . . . , 430-M (hereinafter referred to collectively as "sub-sample headers 430," and individually as "sub-sample header 430"), and sub-samples 440-1, . . . , 440-M (hereinafter referred to collectively as "sub-samples 440," and individually as "sub-sample 440"). Each packet 420 may include packet header 410, sub-sample header 430, and sub-sample 440.

Sub-sample 440 may include media data of media file 400. The media data may include, for example, audio data and/or video data. One or more sub-samples 440 may make up a sample. The sample may include media data, from the one or more sub-samples 440, that is of a particular unit of time (e.g., 1 second) in length when the sample of media data is played by client device 110. Sub-samples 440 may include the same media data as sub-samples 330 (FIG. 3) when media file 400 and media file 300 are for the same content (e.g., a movie).

Sub-sample header 440 may include information about a corresponding sub-sample 440. Sub-sample headers 440 may include the same type of information as included in sub-sample headers 340 (FIG. 3). Sub-sample headers 440 may include the same information as sub-sample headers 340 (FIG. 3) when media file 400 and media file 300 are for the same content.

Packet headers 410 may include metadata of media file 400. The metadata may include a description of all the media data included in sub-samples 440 and/or any other information that may be required by client device 110 in order to play the media data. Collectively, packet headers 410 may include the same metadata as file header 310 (FIG. 3) when media file 400 and media file 300 are for the same content (e.g., a movie).

In one implementation, each individual packet header 410 may only include that portion of the metadata that is applicable to the corresponding sub-sample 440. For example, packet header 410-1 may only include that portion of the metadata that is applicable to sub-sample 440-1. Client device 110 may only require the portion of the metadata included in, for example, packet header 410-1 in order to play the media data included in sub-sample 440-1.

In another implementation, each individual packet header 410 may only include that portion of the metadata that is applicable to a particular set of sub-samples 440 that are included in a set of packets 420. For example, a set of packets 420 may include packet 410-1, packet 410-2, and packet 410-3. Packet header 410-1, packet header 410-2, and packet header 410-3 may only include that portion of the metadata that is applicable to a set of sub-samples 440 that includes sub-sample 440-1, sub-sample 440-2, and sub-sample 440-3. Client device 110 may only require the portion of the metadata included in packet header 410-1, packet header 410-2, and/or packet header 410-3 in order to play the media data included in sub-sample 440-1, sub-sample 440-2, and sub-samples 440-3.

Some client devices 110, which support particular types of packetized formats, may not require the metadata included in packet headers 410 in order to play the media data included in sub-samples 440.

Figure 5:
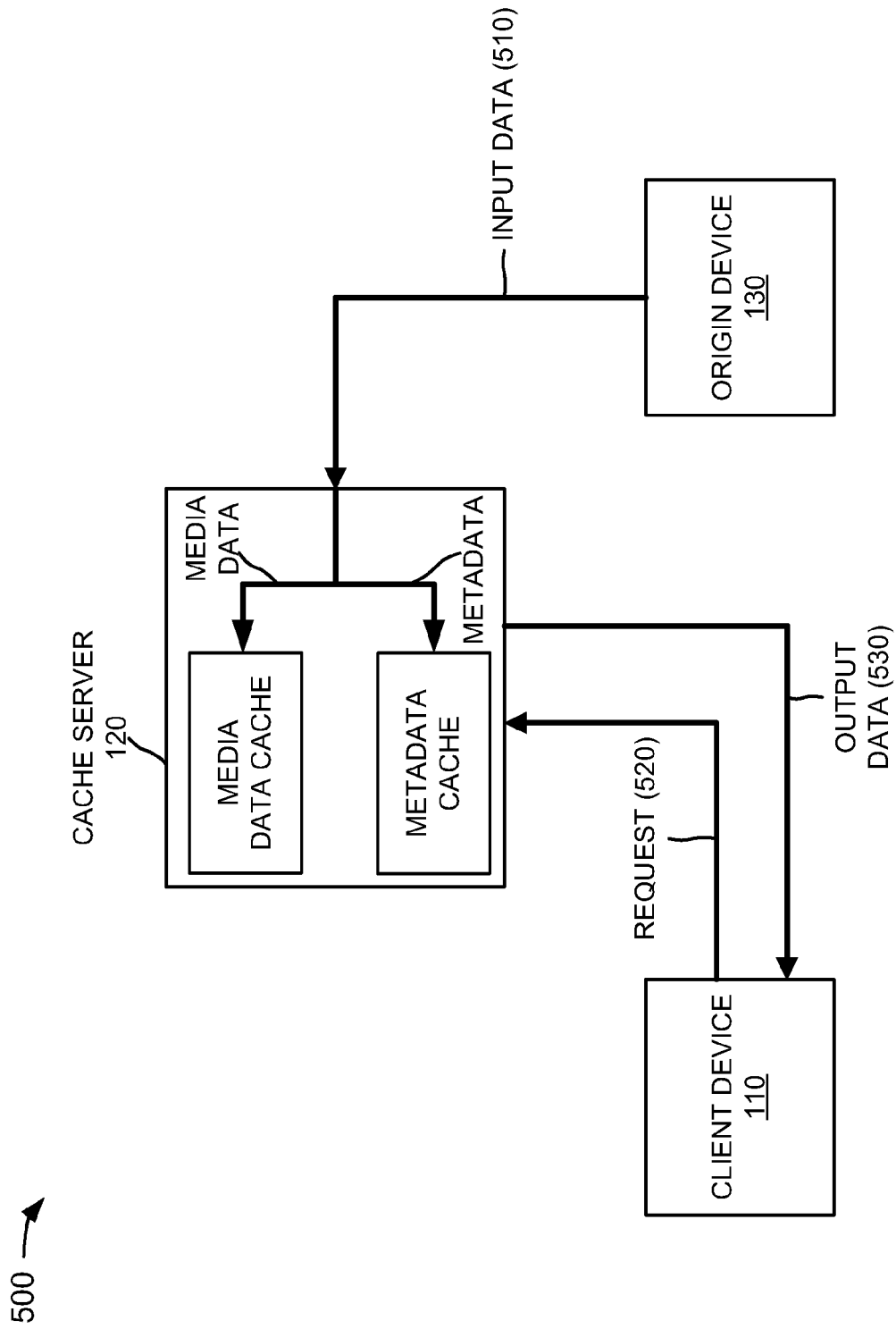
FIG. 5 is a diagram of example operations capable of being performed by an example portion of the network illustrated in FIG. 1.

FIG. 5 is a diagram of example operations capable of being performed by an example portion 500 of network 100. As shown in FIG. 5, portion 500 may include client device 110, cache server 120, and origin device 130. Client device 110, cache server 120, and origin device 130 may include the features described above in connection with, for example, one or more of FIGS. 1 and 2.

As further shown in FIG. 5, origin device 150 may provide input data 510 for a media file to cache server 120. Input data 510 may be in a monolithic format or a packetized format. Cache server 120 may receive input data 510, may extract metadata and media data from input data 510, and may store the metadata and the media data in separate caches.

As also shown in FIG. 5, client device 110 may provide a request 520 to cache server 120, and cache server 120 may receive request 520. In one implementation, request 520 may include a media resource descriptor and a type of format supported by client device 110. The media resource descriptor may include text (e.g., a movie title) that identifies the media file. The type of format may, for example, specify a particular type of the monolithic format or the packetized format that is supported by client device 110.

In another implementation, request 520 may include the media resource descriptor and an Internet protocol (IP) address associated with client device 110. Cache server 120 may determine the type of format supported by client device 110 based on the IP address. For example, cache server 120 may determine that client device 110 that is associated with a particular IP address supports a packetized format. Cache server 120 may determine that a different client device 110 that is associated with a different IP address supports a monolithic format.

Cache server 120 may generate output data 530, for the media file, based on the type of format supported by client device 110. In one implementation, output data 530 may include the media data and the metadata when the type of format indicates that client device 110 requires the metadata to play the media data. Output data 530 may include the media data, and may not include the metadata, when the type of format indicates that client device 110 does not require the metadata to play the media data.

Cache server 120 may provide output data 530 to client device 110. Client device 110 may receive output data 530, and may play the media data included in output data 530.

Although not shown in FIG. 5, client device 110 may provide request 520 to cache server 120 before or after cache server 120 receives input data 510. In the former case, when cache server 120 determines that the requested media file is not stored by cache server 120, cache server 120 may transmit a request for the media file to origin device 130. Origin device 130 may receive the request for the media file, and may provide input data 510 to cache server 120 in response to the request for the media file. As described above, cache server 120 may generate output data 530, based on the metadata and/or the media data included in input data 510, and may provide output data 530 to client device 110.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more tasks described as being performed by one or more other components of network portion 500.

Figure 6:
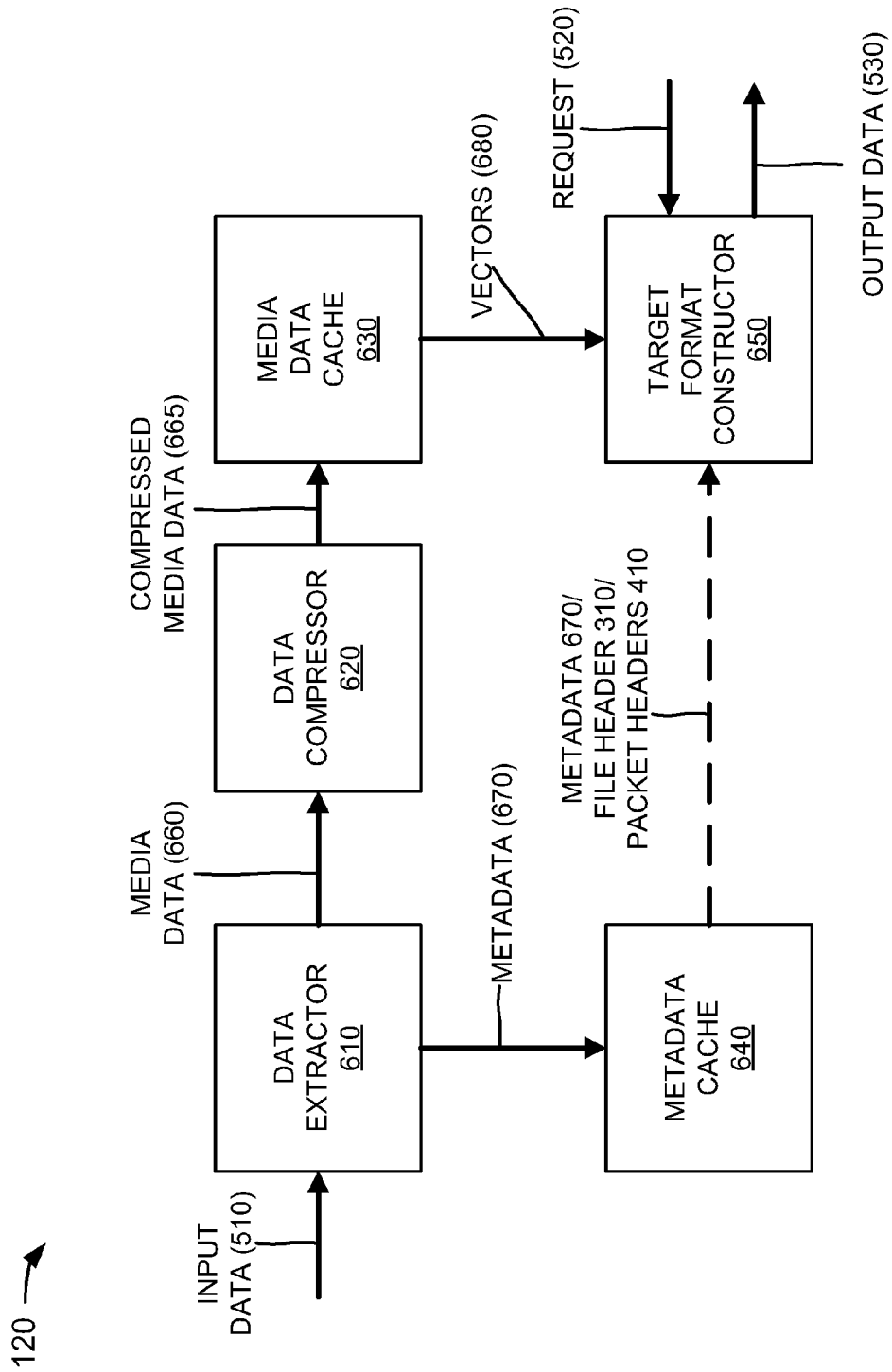
FIG. 6 is a diagram of example functional components of a cache server of FIG. 1.

FIG. 6 is a diagram of example functional components of cache server 120. As shown in FIG. 6, cache server 120 may include a data extractor 610, a data compressor 620, a media data cache 630, metadata cache 640, and a target format constructor 650. In one implementation, one or more of the functional components described in connection with FIG. 6 may be implemented by one or more devices 200 (FIG. 2) or by one or more components of device 200. For example, memory 230 (FIG. 2) may include media data cache 630 and/or metadata cache 640.

Data extractor 610 may extract metadata and media data from data received for a media file. In one example, as further shown in FIG. 6, data extractor 610 may receive input data 510 from origin device 130. Data extractor 610 may determine a type of form of input data 510.

In one example, when input data 510 is in a monolithic format, data extractor 610 may extract media data 660 from sub-samples 340 (FIG. 3), and may extract metadata 670 from file header 310 (FIG. 3). In another example, when input data 510 is in a packetized format, data extractor 610 may extract media data 660 from sub-samples 440 (FIG. 4), and may extract metadata 670 from packet headers 410 (FIG. 4).

As further shown in FIG. 6, data extractor 610 may provide media data 660 to data compressor 620. Data compressor 620 may receive media data 660 from data extractor 610. Thereafter, data compressor 620 may use one or more compression methods (e.g., based on the H.264 video compression standard and/or another standard) to compress media data 660 into compressed media data 665. By compressing media data 660, cache server 120 may use less space to store compressed media data 665 than to store (un-compressed) media data 660.

In one implementation, data compressor 620 may provide compressed media data 665 to media data cache 630. In another implementation, although not shown in FIG. 6, data extractor 610 may determine that media data 660 is already compressed, and may provide media data 660, as compressed media data 655, directly to media data cache 630. Accordingly, media data cache 630 may receive compressed media data 665 from data extractor 610 or data compressor 620.

Media data cache 630 may store compressed media data 665 in vectors 680 (hereinafter referred to individually as vector 680) by using offsets. In one example, media data cache 630 may divide compressed media data 665 into samples. Media data cache 630 may store each sample as an individual vector 680. Media data caches 630 may update an index that includes, for each vector 680, an offset, a length, and/or a reference to a media resource descriptor. The offset may indicate a location of vector 680 in media data cache 630. The length may indicate a size of vector 680. The media resource descriptor may identify the content of the media file, received as input data 510.

As further shown in FIG. 6, data extractor 610 may provide metadata 670 to metadata cache 640. Metadata cache 640 may receive metadata 670 from data extractor 610. In one example implementation, metadata cache 640 may store metadata 670 in association with the media resource descriptor.

In another example implementation, metadata cache 640 may determine that the monolithic format is supported by client devices 110 that often (e.g., more than a particular quantity of times within a particular time period) request content from cache server 120. In response to the determination, metadata cache 640 may generate file header 310 (FIG. 3) based on metadata 670, and may store file header 310. The stored file header 310 may include metadata 670.

In yet another example implementation, metadata cache 640 may determine that the packetized format is supported by client devices 110 that often request content from cache server 120. In response to the determination, metadata cache 640 may generate packet headers 410 (FIG. 4) based on metadata 670, and may store packet headers 410. The stored packet headers 410, collectively, may include metadata 670.

As also shown in FIG. 6, target format constructor 650 may receive request 520, for the content, from client device 110. Target format constructor 650 may determine, based on request 520, the media resource descriptor of the content requested by client device 110 and a type of format supported by client device 110 (hereinafter referred to as "the target format"). Target format constructor 650 may use the index to identify locations at which media data cache 630 stores vectors 680 that are associated with the media resource descriptor. Target format constructor 650 may retrieve vectors 680 from the identified locations of media data cache 630. Vectors 680 may include compressed media data 665.

Target format constructor 650 may determine whether the target format indicates that client device 110 requires metadata 670 to play compressed media data 665 (or media data 660). In one example implementation, when target format constructor 650 determines that client device 110 requires metadata 670, target format constructor 650 may retrieve metadata 670 from metadata cache 640. When the target format is a monolithic format, target format constructor 650 may generate file header 310 (FIG. 3) based on retrieved metadata 670. When the target format is a packetized format, target format constructor 650 may generate packet headers 410 (FIG. 4) based on retrieved metadata 670.

In another example implementation, when target format constructor 650 determines that client device 110 requires metadata 670 and the target format is a monolithic format, target format constructor 650 may retrieve file header 310 from metadata cache 640. In yet another example implementation, when target format constructor 650 determines that client device 110 requires metadata 670 and the target format is a packetized format, target format constructor 650 may retrieve packet headers 410 from metadata cache 640.

Target format constructor 650 may construct output data 530 that is in the target format, and may provide output data 530 to client device 110. When the target format is the monolithic format, output data 530 may include file header 310 and compressed media data 665 (or uncompressed media data 660), from vectors 680, in sub-samples 340 (FIG. 3). When the target format is the packetized format, output data 530 may include packet headers 410 and compressed media data 665 (or uncompressed media data 660), from vectors 680, in sub-samples 440 (FIG. 4).

When target format constructor 650 determines that client device 110 does not require metadata 670 and the target format is a monolithic format, file header 310, included in output data 530, may be empty. When target format constructor 650 determines that client device 110 does not require metadata 670 and the target format is a packetized format, packet headers 410, included in output data 530, may be empty.

Although not shown in FIG. 6, data extractor 610 may further determine whether sub-sample information included in sub-sample headers (e.g., sub-sample headers 330 or sub-sample headers 430) can be automatically reconstructed. In one example, data extractor 610 may determine that the sub-sample information included in the sub-sample headers can be automatically reconstructed when cache server 120 stores or has access to pre-defined rules that can be used to reconstruct the sub-sample information. In another example, data extractor 610 may determine that the sub-sample information included in the sub-sample headers can be automatically reconstructed based on the sub-sample information. For example, data extractor 610 may determine that the sub-sample information included in the sub-sample headers can be automatically reconstructed when the sub-sample information only includes standard information that is included in sub-sample headers.

When data extractor 610 determines that the sub-sample information cannot be automatically reconstructed, data extractor 610 may extract the sub-sample information from input data 510. In one implementation, data extractor 610 may extract the sub-sample information while extracting media data 660, and media data cache 630 may store the sub-sample information in vectors 680, along with the compressed media data 665. In another implementation, data extractor 610 may provide the sub-sample headers to metadata cache 640, and metadata cache 640 may store the sub-sample headers. Target format constructor 650 may include the stored sub-sample information or the stored sub-sample headers in output data 530.

When data extractor 610 determines that the sub-sample information can be automatically reconstructed, cache server 120 may not store the sub-sample information. Target format constructor 650 may reconstruct the sub-sample headers based on pre-defined rules associated with the target format, and may include the reconstructed sub-sample headers in output data 530.

Figure 7:
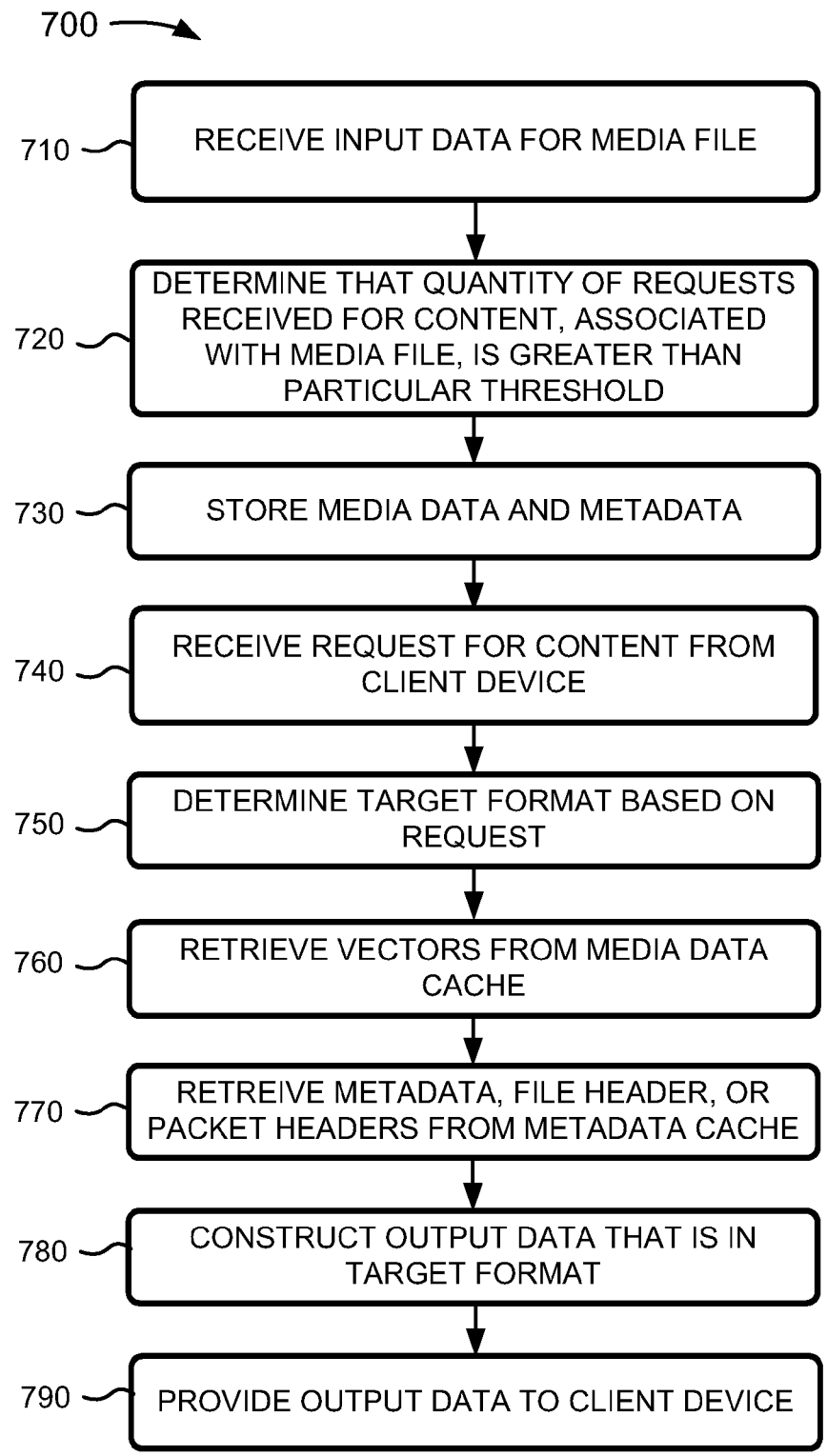
FIGS. 7 and 8 are flow charts of an example process for storing data of a media file.
Figure 8:
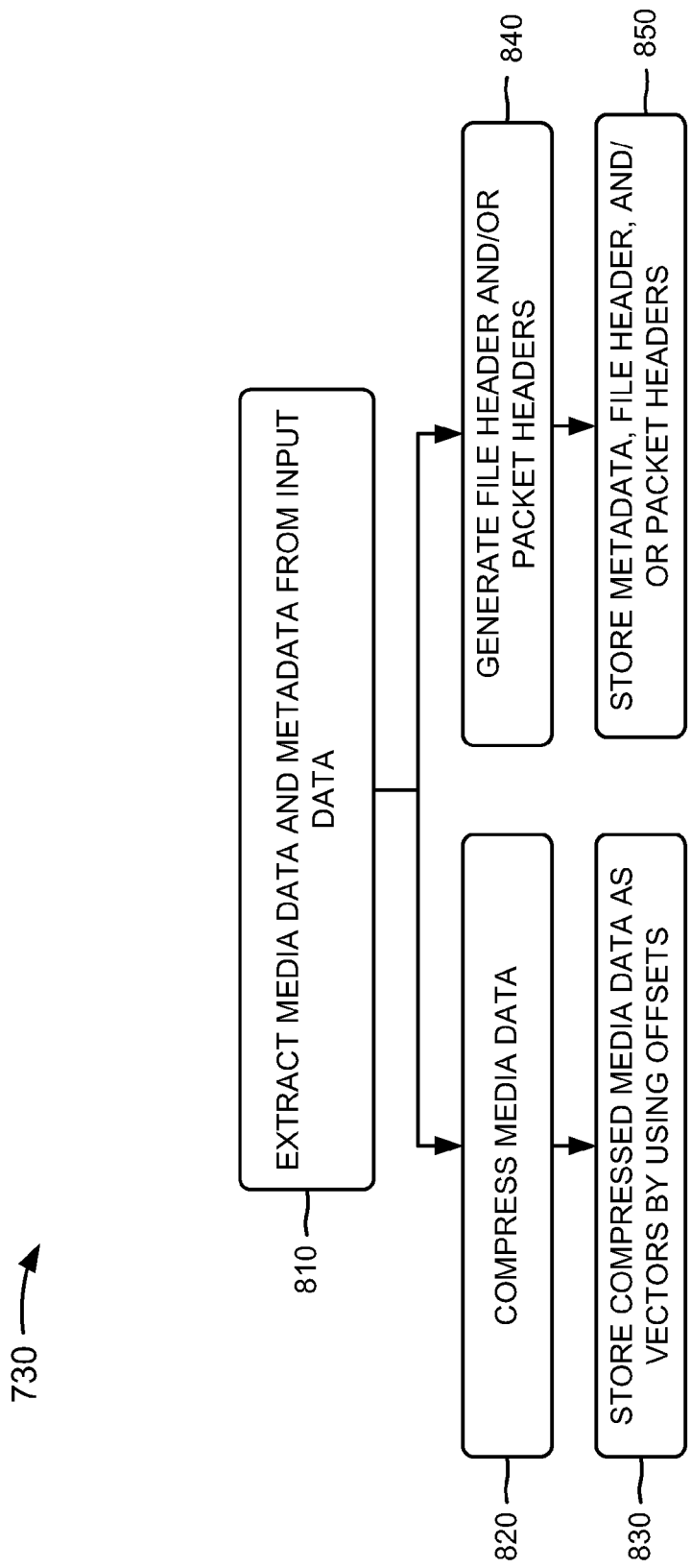

FIGS. 7 and 8 are flow charts of an example process 700 for storing data of a media file. In one implementation, process 700 may be performed by cache server 120. In another implementation, some or all of process 700 may be performed by one or more devices other than cache server 120 or in combination with cache server 120. One or more of the process blocks depicted in FIG. 7 may be performed concurrently and independently of one or more other process blocks.

As shown in FIG. 7, process 700 may include receiving input data for a media file (block 710) and determining that a quantity of requests received for content, associated with the media file, is greater than a particular threshold (block 720). In one implementation, data extractor 610, of cache server 120, may receive input data 510, for a media file, from origin device 130. Data extractor 610 may determine a quantity of requests received, within a particular period of time, for content associated with the media file. Data extractor 610 may determine that the quantity of requests (e.g., 1500) is greater than a particular threshold (e.g., 1000).

Process 700 may further include storing media data and metadata (block 730). Process block 730 may include the process blocks depicted in FIG. 8. As shown in FIG. 8, process block 730 may include extracting media data and metadata from the input data (block 810). In one implementation, when data extractor 610 determines that the quantity of requests is greater than the particular threshold, data extractor 610 may extract media data 660 and metadata 670 from input data 510. When data extractor 610 determines that the quantity of requests is not greater than the particular threshold, data extractor 610 may end process 700 and/or process 800, and may forward the input data into to client device 110 that originally requested the media file.

Process block 730 may further include compressing the media data (block 820) and storing the compressed media data as vectors by using offsets (block 830). In one implementation, data compressor 620 may use one or more compression methods to compress media data 660 into compressed media data 665. Data compressor 620 may provide compressed media data 665 to media data cache 630 for storage. In another implementation, data extractor 610 may determine that media data 660 is already compressed, and may provide media data 660, as compressed media data 655, directly to media data cache 630. Media data cache 630 may divide compressed media data 665 into samples, and may store each sample as an individual vector 680. Media data cache 630 may update an index that includes, for each vector 680, an offset, a length, and a reference to a media resource descriptor. As described above, the offset may indicate a location of vector 680, the length may indicate a size of vector 680, and the media resource descriptor may identify the content of the media file.

Process block 730 may also include generating a file header and/or packet headers (block 840) and storing the metadata, the file header, and/or the packet headers (block 850). In one implementation, metadata cache 640 may determine a first quantity of requests received, within a particular period of time (e.g., the previous 24 hours), from client devices 110 that support the monolithic format. Metadata cache 640 may further determine whether the first quantity is greater than a first threshold. When metadata cache 640 determines that the first quantity is greater than the first threshold, metadata cache 640 may generate file header 310 based on metadata 670, and may store file header 310 in association with the media resource descriptor. When metadata cache 640 determines that the first quantity is less than the first threshold, metadata cache 640 may store metadata 670 instead of storing file header 310.

Additionally, or alternatively, metadata cache 640 may determine a second quantity of requests received, within the particular period of time, from client devices 110 that support the packetized format. Metadata cache 640 may further determine whether the second quantity is greater than a second threshold. The second threshold may equal or be different from the first threshold. When metadata cache 640 determines that the second quantity is greater than the first threshold, metadata cache 640 may generate packet headers 410 based on metadata 670, and may store packet headers 410 in association with the media resource descriptor. When metadata cache 640 determines that the second quantity is less than the second threshold, metadata cache 640 may store metadata 670 instead of storing packet headers 410.

Metadata cache 640 may store metadata 670 in association with the media resource descriptor. In one implementation, metadata cache 640 may only store metadata 670 when metadata cache 640 does not store file header 310 and packet headers 410.

Returning to FIG. 7, process 700 may also include receiving a request for the content from a client device (block 740) and determining a target format based on the request (block 750). For example, target format constructor 650 may receive request 520 from client device 110. In one implementation, request 520 may include the media resource descriptor and a value that specifies a type of format supported by client device 110. Target format constructor 650 may determine the target format based on the value. In another implementation, request 520 may include the media resource descriptor and an IP address associated with client device 110. Target format constructor 650 may determine the target format based on the IP address. To do so, target format constructor 650 may use target format information which specifies target formats that correspond to different IP addresses of client devices 110.

Process 700 may also include retrieving vectors from a media data cache (block 760). For example, target format constructor 650 may identify locations at which media data cache 630 stores vectors 680 that are associated with the media resource descriptor. Target format constructor 650 may retrieve vectors 680 from the identified locations of media data cache 630.

Process 700 may also include retrieving the metadata, the file header, or the packet headers from a metadata cache (block 770) and constructing output data that is in the target format (block 780). For example, in one implementation, when the target format is a monolithic format, target format constructor 650 may determine whether metadata cache 640 stores file header 310 associated with the media resource descriptor. When target format constructor 650 determines that metadata cache 640 stores file header 310, target format constructor 650 may retrieve file header 310 from metadata cache 640. When target format constructor 650 determines that metadata cache 640 does not store file header 310, target format constructor 650 may retrieve metadata 670 from metadata cache 640, and may generate file header 310 based on metadata 670. Target format constructor 650 may use file header 310 and vectors 680 to construct output data 530 that is in the monolithic target format. Output data 530 may include file header 310 and compressed media data 655 from vectors 680.

When the target format is a packetized format, target format constructor 650 may determine whether metadata cache 640 stores packet headers 410 associated with the media resource descriptor. When target format constructor 650 determines that metadata cache 640 stores packet headers 410, target format constructor 650 may retrieve packet headers 410 from metadata cache 640. When target format constructor 650 determines that metadata cache 640 does not store packet headers 410, target format constructor 650 may retrieve metadata 670 from metadata cache 640, and may generate packet headers 410 based on metadata 670. Target format constructor 650 may use packet headers 410 and vectors 680 to construct output data 530 that is in the packetized target format. Output data 530 may include packet headers 410 and compressed media data 655 from vectors 680.

Process 700 may also include providing the output data to the client device (block 790). For example, target format constructor 650 may provide output data 530 to client device 110. Client device 110 may uncompress compressed media data 665 to obtain media data 660 and cause media data 660 to be played by client device 110

Systems and/or methods described herein may provide a cache server that separately stores media data and metadata of a media file, and that generates output data in different types of formats based on the media data and the metadata. As a result, the cache server may provide content, to a client device, in a format supported by the client device. As a result, the cache server does not have to store the same content in different formats.

The foregoing description of implementations provides illustration and description, but is not intended to be exhaustive or to limit the invention to the precise form disclosed. Modifications and variations are possible in light of the above teachings or may be acquired from practice of the invention. For example, packetized formats and monolithic formats are provided as examples. In other implementations, a cache server may receive input data and/or provide output data that are in formats that are different from a packetized format or a monolithic format.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, first data of a media file,
      the first data being in a first type of format;
   determining, by the device, a quantity of requests received for the media file within a particular period of time;
   determining, by the device, that the quantity satisfies a particular threshold;
   extracting, by the device, media data and metadata from the first data based on determining that the quantity satisfies the particular threshold;
   storing, by the device, the media data in a first cache;
   storing, by the device, the metadata in a second cache,
      the second cache being separate from the first cache;
   determining, by the device, a second type of format that is supported by a client device,
      the second type of format being different from the first type of format;
   retrieving, by the device, the media data from the first cache;
   retrieving, by the device, the metadata from the second cache;
   constructing, by the device, second data that is in the second type of format based on the media data and the metadata; and
   providing, by the device, the second data to the client device.

2. The method of claim 1,
   where the first type of format is a monolithic format, and
   where the second type of format is a packetized format.

3. The method of claim 1, further comprising:
   receiving a request from the client device,
      where the request comprises text that identifies the media file and a value that specifies the second type of format, and
      where determining the second type of format comprises:
         determining the second type of format based on the value.

4. The method of claim 1,
   where storing the media data comprises:
      compressing the media data,
      dividing the compressed media data into samples, and
      storing the samples as vectors in different locations of the first cache, and
   where retrieving the media data comprises:
      identifying the locations of the vectors associated with the media file, and
      retrieving the vectors from the identified locations.

5. The method of claim 1,
where storing the metadata comprises:
  generating packet headers based on the metadata, and storing the packet headers in the second cache,
where retrieving the metadata comprises:
  determining that the second type of format is a packetized format, and
  retrieving the packet headers from the second cache, and
where the second data comprises the packet headers.

6. The method of claim 1, where constructing the second data comprises:
  determining that the first type of format is a packetized format,
  generating packet headers based on the retrieved metadata, and
  including the packet headers in the second data.

7. The method of claim 1, where storing the media data in the first cache comprises:
  storing the media data in the first cache without storing the first data in the first type of format or storing the second data in the second type of format.

8. A device comprising:
a first cache;
a second cache,
  the second cache being separate from the first cache; and
a processor to:
  receive first data of a media file,
    the first data being in a first type of format,
  determine a quantity of requests received for the media file within a particular period of time,
  determine that the quantity satisfies a particular threshold,
  extract media data and metadata from the first data based on determining that the quantity satisfies the particular threshold,
  store the media data in the first cache,
  store the metadata in the second cache,
  determine a second type of format that is supported by a client device,
    the second type of format being different from the first type of format,
  retrieve the media data from the first cache,
  retrieve the metadata from the second cache,
  construct second data that is in the second type of format based on the media data and the metadata, and
  provide the second data to the client device.

9. The device of claim 8, where, when receiving the first data of the media file, the processor is to:
  receive, from the client device, a first request for the media file,
  determine that the first cache does not store the media data associated with the media file,
  transmit a second request for the first data to a content provider, and
  receive, in response to the second request, the first data from the content provider.

10. The device of claim 8,
where the first type of format is a monolithic format, and
where the second type of format is a packetized format.

11. The device of claim 8,
where, when storing the media data, the processor is to:
  divide the media data into samples, and
  store the samples as vectors in different locations of the first cache, and
where, when retrieving the media data, the processor is to:
  identify the locations of the vectors associated with the media file, and
  retrieve the vectors from the identified locations, and
where, when constructing the second data, the processor is to:
  include, in the second data, the media data from the vectors.

12. The device of claim 8,
where, when storing the metadata, the processor is to:
  generate a file header based on the metadata, and
  store the file header in the second cache,
where, when retrieving the metadata, the processor is to:
  determine that the second type of format is a monolithic format, and
  retrieve the file header from the second cache, and
where the second data comprises the file header.

13. The device of claim 8, where, when extracting the media data and the metadata from the first data, the processor is to:
  determine that the first type of format of the first data is a monolithic format after determining that the quantity satisfies the particular threshold,
  extract the media data from sub-samples of the first data based on determining that the first type of format of the first data is the monolithic format, and
extract the metadata from a file header associated with the first data based on determining that the first type of format of the first data is the monolithic format.

14. One or more non-transitory computer-readable media for storing instructions, the instructions comprising:
  one or more instructions, which when executed by one or more processors of a computing device, cause the one or more processors to receive first data of a media file, the first data being in a first type of format;
  one or more instructions, which when executed by the one or more processors of the computing device, cause the one or more processors to determine a quantity of requests received for the media file within a particular period of time;
  one or more instructions, which when executed by the one or more processors of the computing device, cause the one or more processors to determine that the quantity satisfies a particular threshold;
  one or more instructions, which when executed by the one or more processors of the computing device, cause the one or more processors to extract media data and metadata from the first data based on determining that the quantity satisfies the particular threshold;
  one or more instructions, which when executed by the one or more processors of the computing device, cause the one or more processors to store the media data in a first cache and the metadata in a second cache,
    the first cache and the second cache being separate caches;
  one or more instructions, which when executed by the one or more processors of the computing device, cause the one or more processors to determine a second type of format that is supported by a client device,
    the second type of format being different from the first type of format;
  one or more instructions, which when executed by the one or more processors of the computing device, cause the one or more processors to retrieve the media data and the metadata from the separate caches;
  one or more instructions, which when executed by the one or more processors of the computing device, cause the one or more processors to construct second data that is in the second type of format based on the media data and the metadata; and
  one or more instructions, which when executed by the one or more processors of the computing device, cause the one or more processors to provide the second data to the client device.

15. The media of claim 14,
where the first type of format is a monolithic format, and
where the second type of format is a packetized format.

16. The media of claim 14,
where the instructions further comprise:
one or more instructions to receive a request from the client device,
where the request comprises text that identifies the media file and an Internet protocol (IP) address associated with the client device, and
where the one or more instructions to determine the second type of format comprise:
one or more instructions to determine the second type of format based on the IP address.

17. The media of claim 14,
where the one or more instructions to store the media data comprise:
one or more instructions to compress the media data,
one or more instructions to divide the compressed media data into samples, and
one or more instructions to store the samples as vectors in different locations of the first cache of the separate caches,
where the one or more instructions to retrieve the media data comprise:
one or more instructions to identify the locations of the vectors associated with the media file, and
one or more instructions to retrieve the vectors from the identified locations, and
where the one or more instructions to construct the second data comprise:
one or more instructions to include, in the second data, the compressed media data from the vectors.

18. The media of claim 14,
where the one or more instructions to store the metadata comprise:
one or more instructions to generate one or more headers based on the metadata, and
one or more instructions to store the one or more headers in the second cache of the separate caches,
where the one or more instructions to retrieve the metadata comprise:
one or more instructions to retrieve, from the second cache of the separate caches, one or more of the one or more headers, and
where the one or more instructions to construct the second data comprise:
one or more instructions to include, in the second data, one or more of the one or more headers.

19. The media of claim 14, where the one or more instructions to construct the second data comprise:
one or more instructions to determine that the first type of format is a packetized format,
one or more instructions to generate packet headers based on the retrieved metadata, and
one or more instructions to include the packet headers in the second data.

20. The media of claim 14, where the one or more instructions to extract the media data and the metadata from the first data comprise:
one or more instructions, which when executed by the one or more processors of the computing device, cause the one or more processors to:
determine that the first data is in the first type of format; and
extract the media data and the metadata from the first data in a particular manner based on determining that the first data is in the first type of format and based on determining that the quantity satisfies the particular threshold.

* * * * *